Figure 7:
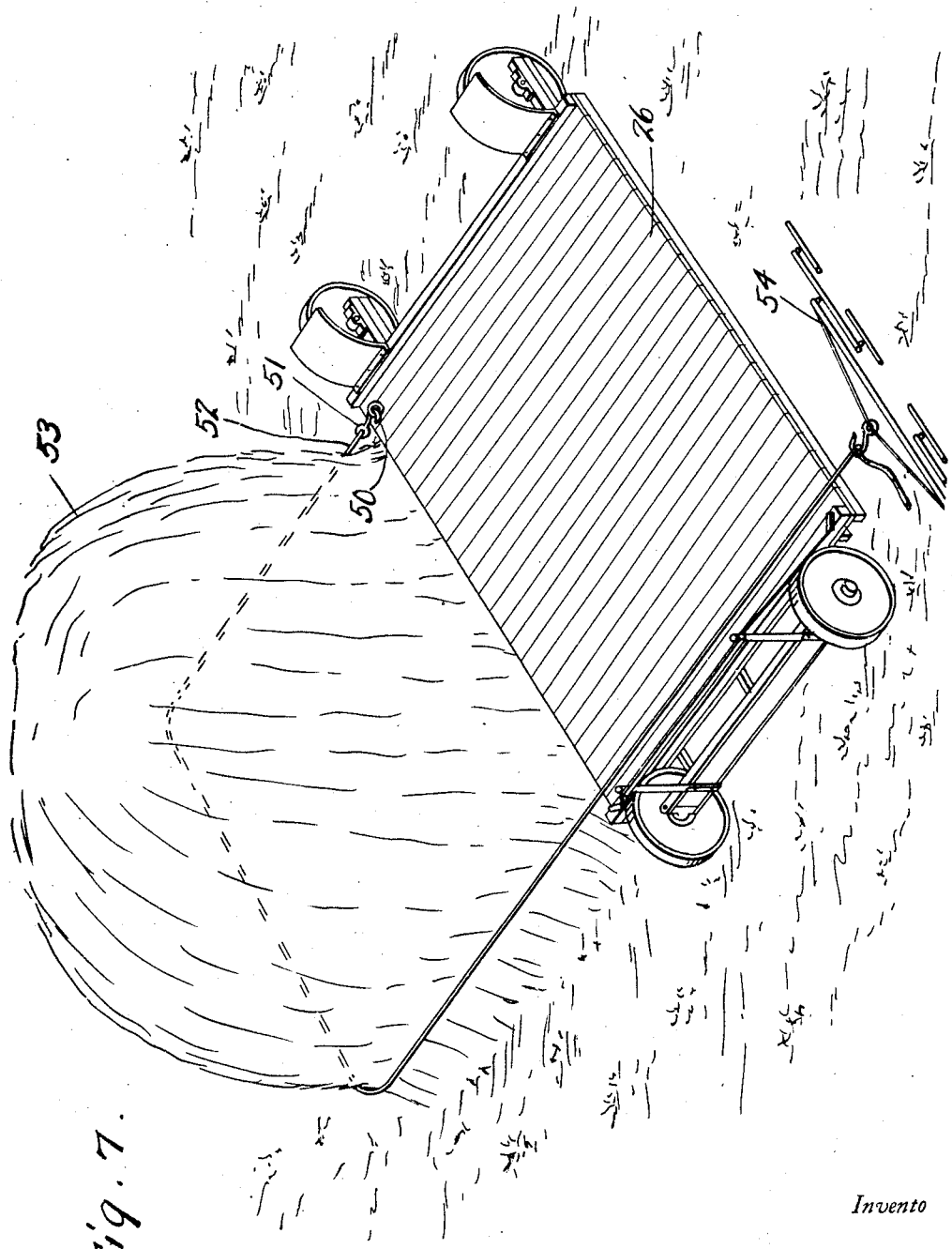

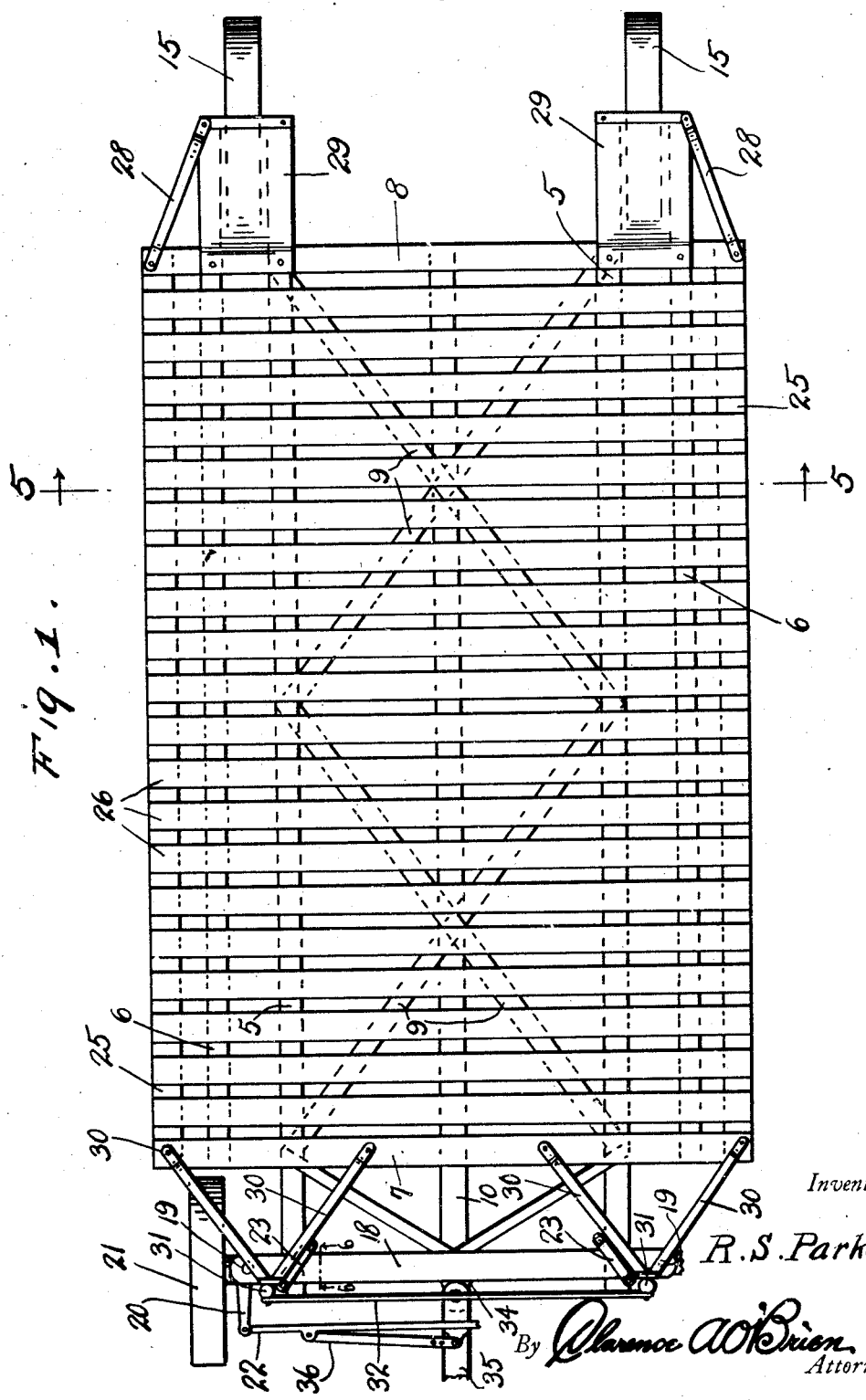

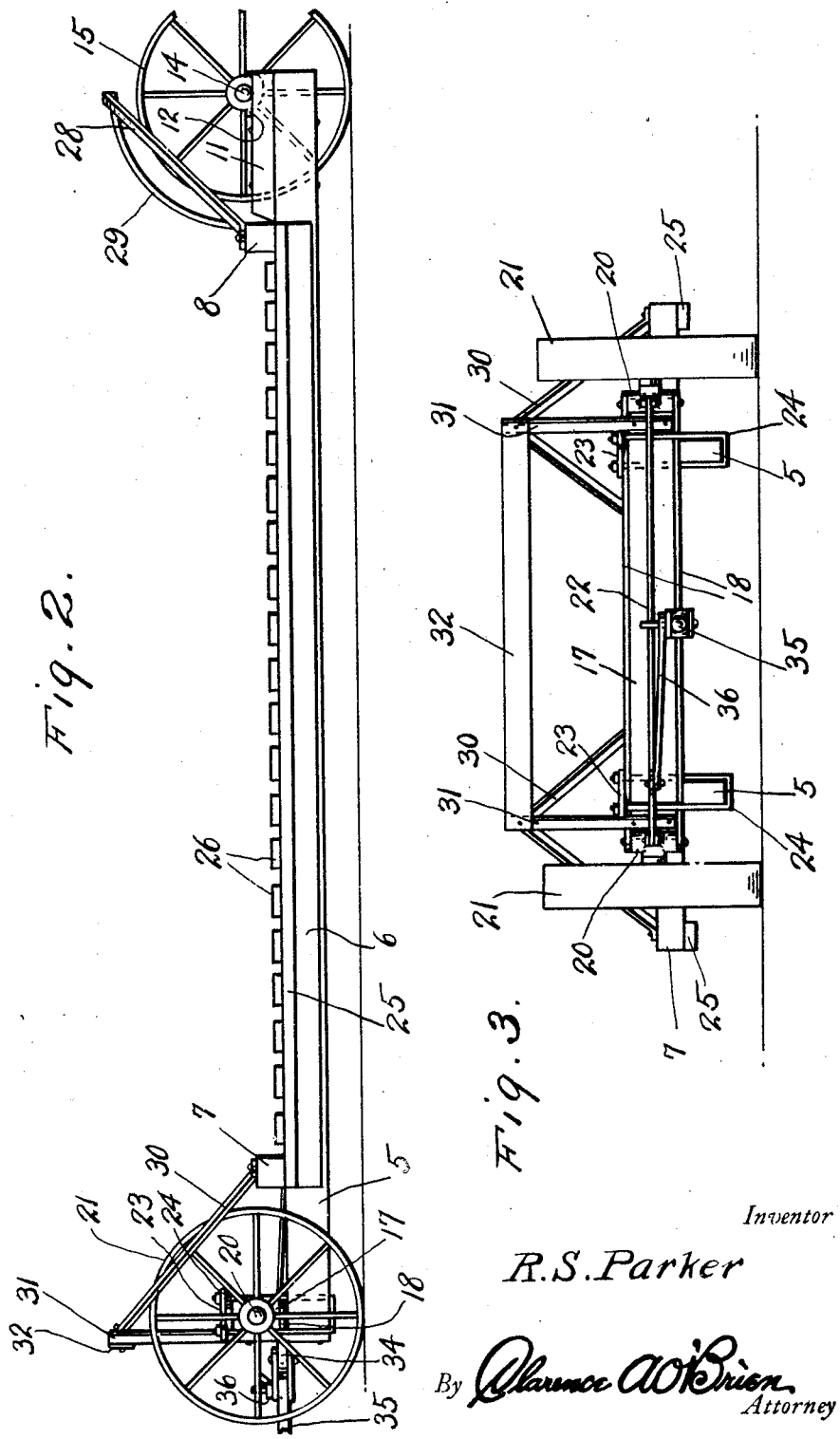

Oct. 8, 1929.  R. S. PARKER  1,730,943
HAY WAGON
Filed Sept. 5, 1928    5 Sheets-Sheet 3

Inventor
R. S. Parker
By Clarence A. O'Brien
Attorney

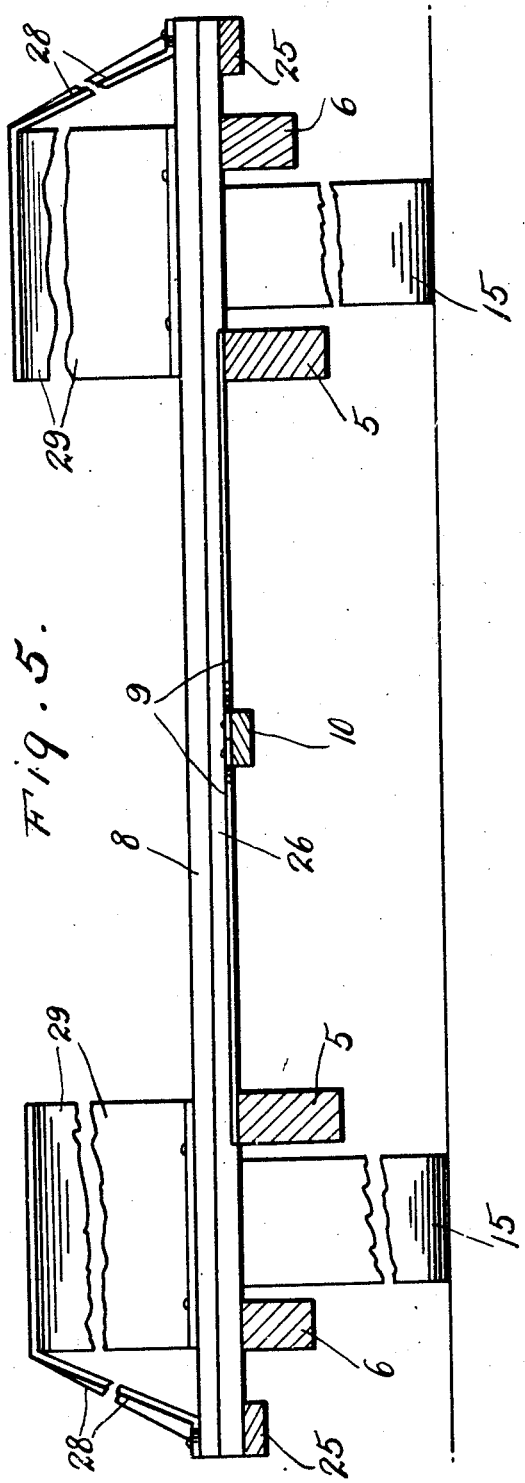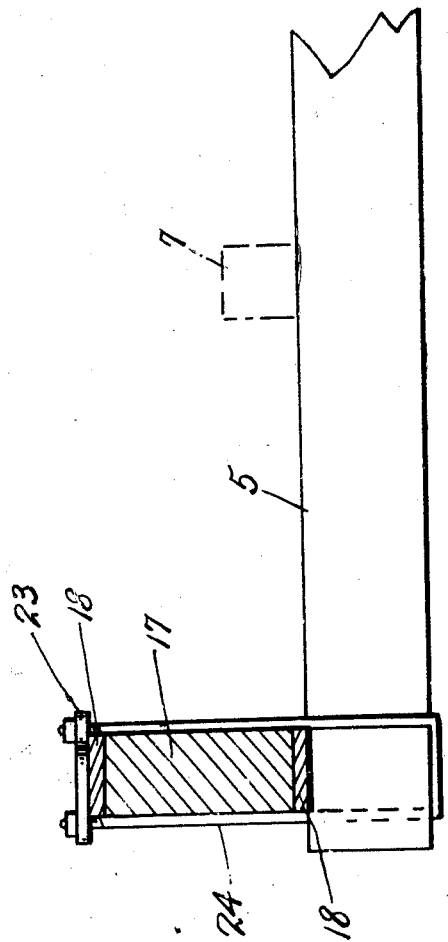

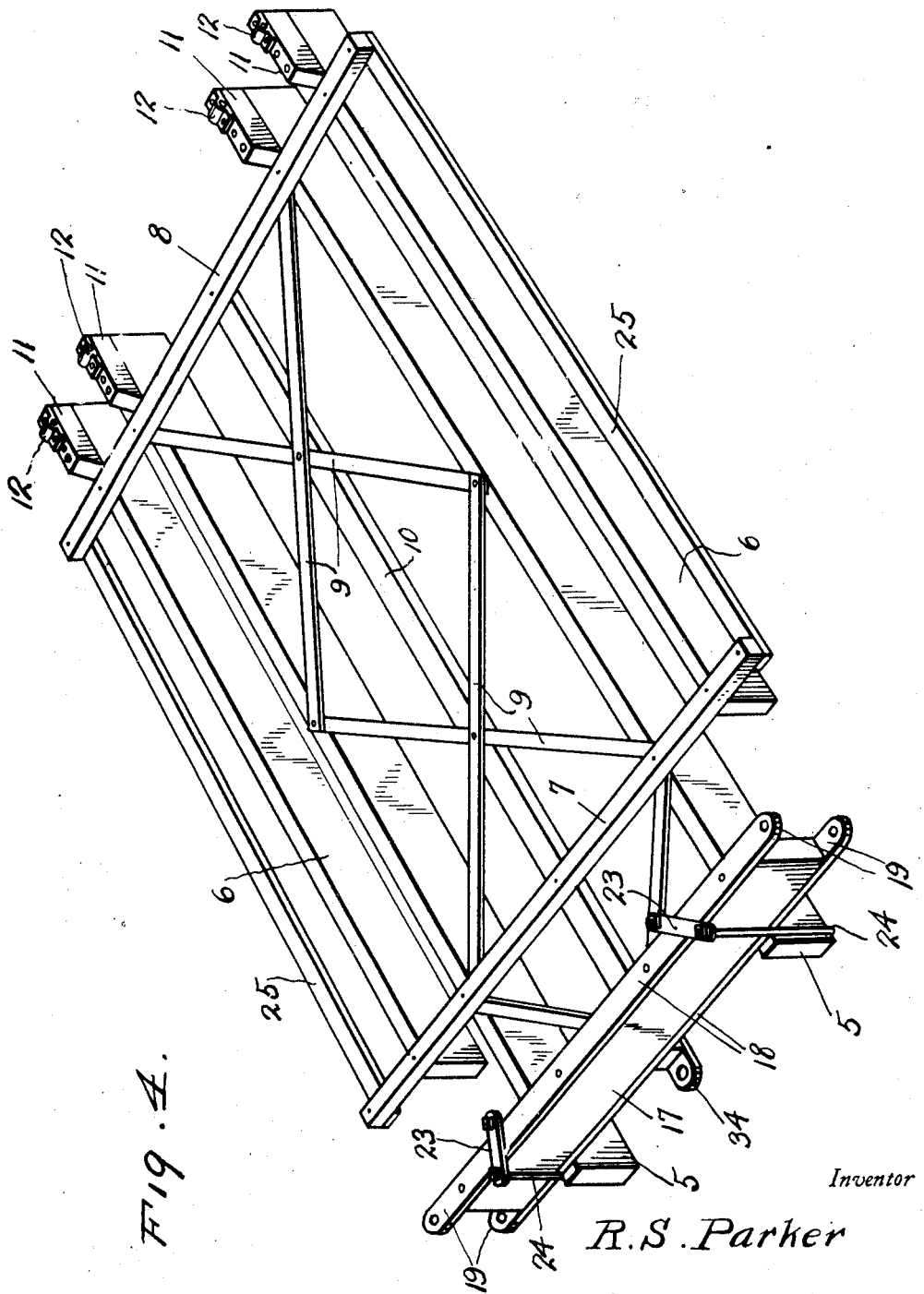

Patented Oct. 8, 1929

1,730,943

UNITED STATES PATENT OFFICE

ROY S. PARKER, OF MERRIMAN, NEBRASKA

HAY WAGON

Application filed September 5, 1928. Serial No. 304,077.

The present invention relates to a hay wagon and has for its prime object to provide a structure which enables a ranchman to handle hay from a settled stack with a minimum of labor and expense.

Another very important object of the invention resides in the provision of a wagon of this nature having an underslung low flat body so that a stack of hay may be dragged on to the body without materially disturbing the stack thus eliminating the necessity of the usual slow and arduous method now in common use and to save long time used in the carrying out of the usual method.

A still further very important object of the invention resides in the provision of a hay wagon of this nature which is exceedingly simple in its construction, strong and durable, inexpensive to manufacture, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the hay wagon embodying the features of my invention, Figure 2 is a side elevation thereof, Figure 3 is a front elevation thereof, Figure 4 is a perspective view of the body of the wagon, Figure 5 is a transverse vertical section taken substantially on the line 5—5 of Figure 1, Figure 6 is an enlarged detail section through the front axle structure, and Figure 7 is a perspective view of the hay wagon showing the means utilized for drawing the stack of hay on to the wagon body.

Referring to the drawing in detail, it will be seen that numerals 5 denote longitudinal spaced parallel main sills and numerals 6 denote auxiliary sills disposed in spaced parallelism to the sills 5 and to the outside thereof.

The sills 5 are longer than the sills 6 as is clearly illustrated in Figure 4. The sills are held in spaced parallel relation by means of cross members 7 and 8. A series of diagonal braces 9 are disposed between the sills 5 and have intermediate portions fixed to a longitudinal bar 10 extending from the center of the cross member 8 past the center of the front cross member 7 terminating a distance forwardly thereof.

Bearing blocks 11 are mounted on the rear end of the sills 5 and 6 to rise therefrom and have supported thereon bearings 12. Axles 14 are mounted in the bearings 12 so that one extends between adjacent sills 5 and 6. Wheels 15 are supported on the outer extremity of these axles 14 to the outer side of the auxiliary sills 6.

An axle beam 17 is provided with bars 18 fixed to the longitudinal edges thereof and extending beyond the edges thereof and the extremities of these bars are apertured as at 19 for receiving spindles 20 on which are journaled wheels 21. The spindles are connected by a connecting rod 22 so that the wheels 21 will be steered in unison. The axle assembly 17, 18 is mounted on the front extremity of the sills 5 by means of clamps including plates 23 and U-bolts 24.

Longitudinal members 25 connect the extremities of the cross members 7 and 8 and are disposed to the outside of the auxiliary sills 6. A plurality of cross slats 26 are fastened to the sills 5 and 6 and the longitudinal members 25 to form a bed.

Arms 28 are fixed to the extremities of the cross member 8 and incline upwardly and rearwardly and are extended slightly inwardly toward each other and support the upper extremities of arcuate imperforated or solid fenders 29 the lower extremities of which are fixed to the cross member 8.

These fenders extend over the forward portions of the rear wheels 15. Two pairs of arms 30 are attached to the cross member 7. Each pair has its arms inclining upwardly and forwardly and converging toward each other toward the upper ends of standards 31 fixed to the extremities of the axle beam 17.

These standards support at their upper ends a cross bar 32. An apertured plate 34 extends from the forward end of the bar 10 and has pivotally engaged therewith a tongue 35 and a link 36 is engaged with the tongue and with an intermediate portion of the connecting rod 22 adjacent one end so that as the tongue is swung from side to side the wheels 31 are steered. It is thought that the construction of this wagon will now be quite apparent to those skilled in this art without a more detailed description thereof.

In Figure 7 it will be seen that I have an eye bolt or the like 50 at one rear corner of the wagon body so that a hook 51 may be engaged thereon. A cable 52 is engaged on the hook 51 to be placed about a stack of hay 53 on the ground and then brought across the front of the wagon bed and engaged with draft means 54 which may be moved transversely of and away from the wagon thereby dragging the stack of hay on to the wagon body.

It will be seen that the bed of the wagon is underslung and at a very low level so that a stack of hay weighing four or five tons may be easily dragged thereon without being disturbed to any great extent. The structure is very strong and durable and is capable of being easily manipulated in the field.

The present embodiment of the invention, however, has been disclosed in detail merely for the purpose of exemplification since in actual practice it attains the features of advantage enumerated as desirable in the statement of the invention and the above description.

It will be apparent that changes in the details of construction, and in the combination of parts as will be hereinafter claimed without departing from the spirit or scope of the invention or sacrificing any of its advantages.

Having thus described my invention, what I claim as new is:

1. A wagon structure of the class described comprising a pair of spaced parallel inner sills, and a pair of spaced parallel outer sills spaced from said inner sills and shorter than said inner sills, the rear ends of the sills terminating in the same transverse line so that the forward ends of the inner sills terminate forwardly beyond the forward end of the outer sills, means connecting the sills, blocks on the rear ends of the sills, bearing brackets on the block, said block rising from the sill, axles in said bearing brackets, and terminating beyond the side sills, wheels on the outer ends of the shaft, and a front wheel assembly for suspending the forward end of the inner sill.

2. A wagon structure of the class described comprising a pair of spaced parallel inner sills, and a pair of spaced parallel outer sills spaced from said inner sills and shorter than said inner sills, the rear ends of the sills terminating in the same transverse line so that the forward ends of the inner sills terminate forwardly beyond the forward end of the outer sills, means connecting the sills, blocks on the rear ends of the sills, bearing brackets on the block, said block rising from the sill, axles in said bearing brackets, and terminating beyond the side sills, wheels on the outer ends of the shaft, an axle beam across the tops of the front end of the inner sills, a pair of front wheels, means dirigibly mounting the front wheels on the extremities of the axles.

3. A wagon structure of the class described comprising a pair of spaced parallel inner sills, and a pair of spaced parallel outer sills spaced from said inner sills and shorter than said inner sills, the rear ends of the sills terminating in the same transverse line so that the forward ends of the inner sills terminate forwardly beyond the forward end of the outer sills, means connecting the sills, blocks on the rear ends of the sills, bearing brackets on the block, said block rising from the sill, axles in said bearing brackets, and terminating beyond the side sills, wheels on the outer ends of the shaft, an axle beam across the tops of the front end of the inner sills, a pair of front wheels, means dirigibly mounting the front wheels on the extremities of the axles, longitudinal bars to the outer sides of the outer sills and spaced therefrom by the means connecting the sills, and transverse slats extending across the longitudinal bars and the sills fixed thereto.

4. A wagon structure of the class described comprising a pair of spaced parallel inner sills, and a pair of spaced parallel outer sills spaced from said inner sills and shorter than said inner sills, the rear ends of the sills terminating in the same transverse line so that the forward ends of the inner sills terminate forwardly beyond the forward end of the outer sills, means connecting the sills, blocks on the rear ends of the sills, bearing brackets on the block, said block rising from the sill, axles in said bearing brackets, and terminating beyond the side sills, wheels on the outer ends of the shaft, an axle beam across the tops of the front end of the inner sills, a pair of front wheels, means dirigibly mounting the front wheels on the extremities of the axles, longitudinal bars to the outer sides of the outer sills and spaced therefrom by the means connecting the sills, and transverse slats extending across the longitudinal bars and the sills fixed thereto, diagonal braces between the inner sills.

5. A wagon structure of the class described comprising a pair of spaced parallel inner sills, and a pair of spaced parallel outer sills spaced from said inner sills and shorter than said inner sills, the rear ends of the sills terminating in the same transverse line so that the forward ends of the inner sills terminate forwardly beyond the forward end of the outer sills, means connecting the sills, blocks on the rear ends of the sills, bearing brackets on the block, said block rising from the sill, axles in said bearing brackets, and terminating beyond the side sills, wheels on the outer ends of the shaft, an axle beam across the tops of the front end of the inner sills, a pair of front wheels, means dirigibly mounting the front wheels on the extremities of the axles, longitudinal bars to the outer sides of the outer sills and spaced therefrom by the means connecting the sills, and transverse slats extending across the longitudinal bars and the sills fixed thereto, diagonal braces between the inner sills, a center longitudinal bar terminating under the axle beam, a tongue, means for pivotally engaging the tongue with the forward end of the center bars, and means operatively connecting the tongue with the dirigible front wheel so that when the tongue is swung said wheels are steered.

6. A wagon structure of the class described comprising a pair of spaced parallel inner sills, and a pair of spaced parallel outer sills spaced from said inner sills and shorter than said inner sills, the rear ends of the sills terminating in the same transverse line so that the forward ends of the inner sills terminate forwardly beyond the forward end of the outer sills, means connecting the sills, blocks on the rear ends of the sills, bearing brackets on the block, said block rising from the sill, axles in said bearing brackets, and terminating beyond the side sills, wheels on the outer ends of the shaft, an axle beam across the tops of the front end of the inner sills, a pair of front wheels, means dirigibly mounting the front wheels on the extremities of the axles, longitudinal bars to the outer sides of the outer sills and spaced therefrom by the means connecting the sills, and transverse slats extending across the longitudinal bars and the sills fixed thereto, diagonal braces between the inner sills, a center longitudinal bar terminating under the axle beam, a tongue, means for pivotally engaging the tongue with the forward end of the center bars, and means operatively connecting the tongue with the dirigible front wheel so that when the tongue is swung said wheels are steered, a pair of standards rising from the extremities of the axle beam, a cross bar between the upper ends of the standards.

7. A wagon structure of the class described comprising a pair of spaced parallel inner sills, and a pair of spaced parallel outer sills spaced from said inner sills and shorter than said inner sills, the rear ends of the sills terminating in the same transverse line so that the forward ends of the inner sills terminate forwardly beyond the forward end of the outer sills, means connecting the sills, blocks on the rear ends of the sills, bearing brackets on the block, said block rising from the sill, axles in said bearing brackets, and terminating beyond the side sills, wheels on the outer ends of the shaft, an axle beam across the tops of the front end of the inner sills, a pair of front wheels, means dirigibly mounting the front wheels on the extremities of the axles, longitudinal bars to the other sides of the outer sills and spaced therefrom by the means connecting the sills, and transverse slats extending across the longitudinal bars and the sills fixed thereto, diagonal braces between the inner sills, a center longitudinal bar terminating under the axle beam, a tongue, means for pivotally engaging the tongue with the forward end of the center bars, and means operatively connecting the tongue with the dirigible front wheel so that when the tongue is swung said wheels are steered, a pair of standards rising from the extremities of the axle beam, a cross bar between the upper ends of the standards, arms extending upwardly and forwardly from the connecting means between the sills for bracing the upper ends of the standard.

In testimony whereof I affix my signature.

ROY S. PARKER.